(12) United States Patent
Johanson et al.

(10) Patent No.: US 6,888,926 B2
(45) Date of Patent: May 3, 2005

(54) EXTENSION TELEPHONE ANSWERING DEVICE AND SYSTEM EMPLOYING SAME

(75) Inventors: James A. Johanson, Macungie, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 94 days.

(21) Appl. No.: 09/809,103

(22) Filed: Mar. 16, 2001

(65) Prior Publication Data

US 2002/0131562 A1 Sep. 19, 2002

(51) Int. Cl.[7] .................................................. H04M 1/64
(52) U.S. Cl. .............................. 379/67.1; 379/102.02; 379/455; 379/462
(58) Field of Search .................... 379/67.1, 70, 79, 379/88.18, 102.01, 102.02, 110.01; 455/412, 413, 418, 462, 463, 464, 465, 567, 569, 569.1

(56) References Cited

U.S. PATENT DOCUMENTS

| | | | | | |
|---|---|---|---|---|---|
| 4,881,259 A | * | 11/1989 | Scordato | ...................... | 455/412 |
| 4,903,289 A | * | 2/1990 | Hashimoto | ................... | 455/412 |
| 5,631,745 A | * | 5/1997 | Wong et al. | ................. | 358/434 |
| 5,706,334 A | * | 1/1998 | Balk et al. | ................ | 379/88.13 |
| 5,953,656 A | * | 9/1999 | Bertocci | ...................... | 455/412 |
| 6,006,088 A | * | 12/1999 | Couse | .......................... | 455/415 |
| 6,021,324 A | * | 2/2000 | Sizer et al. | ................. | 455/403 |
| 6,061,435 A | * | 5/2000 | Grundvig et al. | ....... | 379/102.03 |
| 6,104,923 A | * | 8/2000 | Kite | ............................ | 455/412 |
| 6,148,213 A | * | 11/2000 | Bertocci et al. | ............ | 455/462 |
| 6,223,029 B1 | * | 4/2001 | Stenman et al. | ............ | 455/420 |
| 6,389,293 B1 | * | 5/2002 | Clore et al. | ................. | 455/462 |
| 6,400,814 B1 | * | 6/2002 | Adams | .................... | 379/142.01 |
| 6,757,360 B1 | * | 6/2004 | Tolopka | ..................... | 379/67.1 |
| 2001/0014599 A1 | * | 8/2001 | Henderson | .................. | 455/412 |
| 2002/0002707 A1 | * | 1/2002 | Ekel et al. | ..................... | 725/87 |
| 2002/0061095 A1 | * | 5/2002 | Beecroft | ................ | 379/100.01 |

FOREIGN PATENT DOCUMENTS

WO      WO 94/27394     * 11/1994

* cited by examiner

Primary Examiner—Scott L. Weaver

(57) ABSTRACT

A wireless answering system is disclosed in which answering functions executed at a main telephone answering device can be controlled from an extension answering device. The extension answering device is able to record new outgoing messages, screen calls and playback messages recorded at the main telephone answering device. Communication between the main telephone answering device and extension telephone answering device are by way of wireless communications, preferably through a Bluetooth™ compliant communications path.

35 Claims, 4 Drawing Sheets

EXTENSION TELEPHONE ANSWERING DEVICE AND SYSTEM EMPLOYING SAME

FIELD OF THE INVENTION

The present invention is directed to telephone answering devices.

A telephone answering device (TAD) is useful for screening calls, recording outgoing messages, and recording and playing back incoming messages. However, the TAD functions are only useful if you are near to the TAD device. If you are in another part of a building having a TAD device, you may not be able to hear a caller leaving a message, and thus may not be able to decide whether or not to pick up the phone. In addition, in order to record an outgoing message or playback recorded messages, one must be at the location of the TAD. This is often inconvenient, particularly if a user is a large distance from the TAD device.

In an effort to somewhat alleviate the distance a user must travel in order to access a TAD device, some cordless telephones provide for control of a TAD device built into a base station through a cordless handset. However, if the handset user is in the process of using the handset for a telephone call, the TAD device cannot be accessed. In addition, often a user must stop what he or she is doing in order to pick up the handset and press the button or buttons necessary to access the TAD feature. During this time, the handset is not otherwise useable for placing or receiving telephone calls.

SUMMARY OF THE INVENTION

The present invention provides an extension telephone answering device which is in wireless communications with a main telephone answering device connected to a telephone line. The extension telephone answering device is not connected to the telephone line, and does not control any switch hook function and is therefore incapable of initiating or answering a telephone call. The extension telephone answering device is a stand alone unit which communicates with the main telephone answering device to send operating commands to the main telephone answering device and to receive recorded messages from the main answering device. The extension telephone answering device is also capable of sending an outgoing message to the main telephone device which records it for use in answering a telephone call.

The extension telephone answering device may transmit commands such as playback, record, stop, delete, next message, previous message, etc., normally associated with a telephone answering device, and those commands, when received at the main telephone answering device, are acted on by the main telephone answering device which also provides an appropriate response back to the extension telephone answering device. For example, for a received playback command the main telephone answering device would transmit a recorded telephone message to the extension telephone answering device for playback thereat.

The extension telephone answering device is registered with the main telephone answering device so that the two are bonded for wireless communications. The wireless communications may be through a Bluetooth™ complaint communications link. More than one extension telephone answering device can be bonded to a main telephone answering device so that the extension telephone devices can be placed at various locations within a building.

Thus the invention provides an extension answering device which enables a user to screen calls from a location within a building remote from the location of a main telephone answering device, and record an outgoing message and playback recorded messages. The extension answering device also does not interfere with normal operation of the main telephone answering device, or other telephone devices connected to a telephone line and can be used with other extension telephone answering devices, each bonded to the same main telephone answering device.

These and other advantages and features of the invention will be more clearly understood from the following detailed description which is provided in connection with the accompanying drawings.

DETAILED DESCRIPTION OF THE INVENTION

Figure 1:
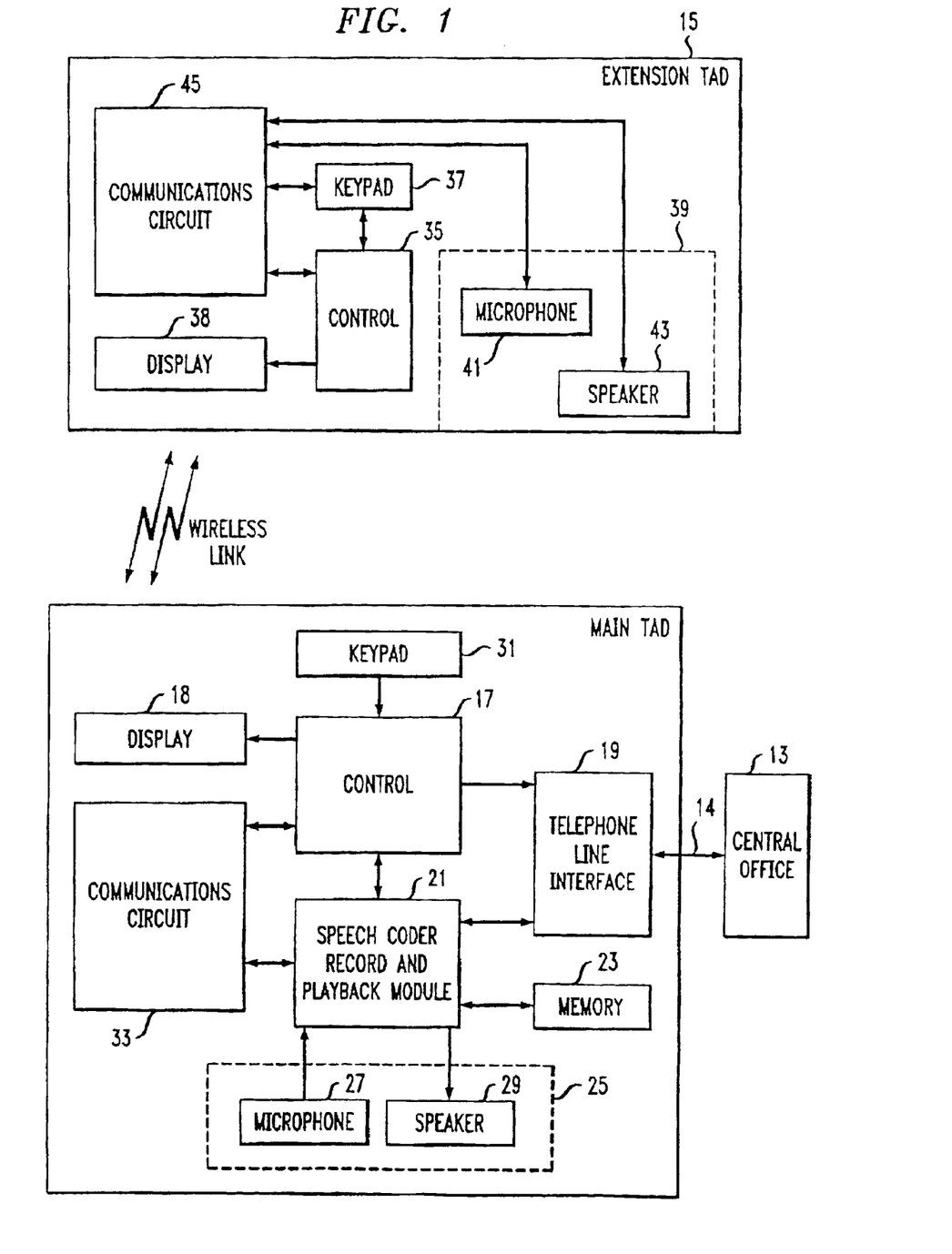
FIG. 1 illustrates in block diagram form a main telephone answering device and an extension telephone answering device provided in accordance with an embodiment of the invention.

An exemplary embodiment of a telephone answering system in accordance with the invention, which includes both a main telephone answering device and an extension telephone answering device, is illustrated in FIG. 1.

The main telephone answering device 11 is shown as connected through a conventional telephone line 14 to a central office 13 through a telephone line interface 19. Operations of the main telephone answering device 11 are controlled by a control circuit 17 which may, for example, be a microprocessor implemented control circuit, although any type of analog, digital analog/digital control circuit may be used.

The control circuit 17 connects to and controls a line interface 19 and is also connected to a speech coder 21 which records and plays back telephone messages, a display 18 for displaying answering machine information and to a communications circuit 33, which may be a Bluetooth™ compliant transceiver. Control circuit 17 also receives input from an input device such as a keypad 31. A memory 23 is associated with the speech coder 21 and stores both an outgoing message and incoming messages received over telephone line 14.

In the illustrated embodiment, the speech coder 21 is constructed as a digital device which takes analog audio inputs and converts them into encoded digital speech for storage in memory 23 and which takes encoded digital speech stored in memory 23 and converts it to an analog audio output. As noted, the messages stored in memory 23 include an outgoing message which is provided on the telephone line 14 through the telephone line interface 19 from the speech coder 21, as well as incoming telephone messages received on telephone line 14 through line interface 19 and provided to speech coder 21.

Speech coder 21 is also connected to an audio circuit 25 which includes a microphone 27 and a speaker 29. Audio circuit 25 is provided for receiving analog audio messages and playing back analog audio messages.

The communications circuit 33 is designed to provide wireless communications with a similar communications circuit 45 provided in an extension telephone answering device 15. The extension telephone answering device 15 also includes a control circuit 35 which is coupled to a display 38, the communications circuit 45, and to an input device such as a keypad 37. Control circuit 35 may be a microprocessor control circuit, or any type of analog, digital or analog/digital control circuit can be used. An audio circuit 39 is also provided at the extension telephone answering device 15 which includes a microphone 41 and a speaker 43. The audio circuit 39 is in communication with the communications circuit 45.

As will be described in more detail below, the main telephone answering device 11 functions as a conventional telephone answering device to record and play an outgoing message, record incoming messages, and provide user input commands through keypad 31 to perform the operations of recording an outgoing message; playing back recorded telephone messages; as well as the functions of stopping an outgoing message or recording of an incoming message; deleting a recorded message; forwarding to a next recorded message; returning to a previously recorded message; and other functions such as volume adjustment.

In addition to the normal telephone answering device functions, the main telephone answering device 11 is also able to communicate with the extension telephone answering device 15 by means of communications circuit 33 and communications circuit 45. The communications link established between the communications circuits 33 and 45 provides for an exchange of both command information and audio information between the two units. Thus, the extension telephone answering device 15 can receive commands through keypad 37 to which control circuit 35 is responsive to send those commands through communication circuit 45 to communication circuit 33 in the main telephone answering device.

These commands are received by control circuit 17 within the main telephone answering device 11 and are acted on. The commands which can be transmitted from extension telephone answering device 15 to the main telephone answering device 11 include commands which cause a recording of an outgoing message, a playback of a previously recorded message, a stop command for stopping an outgoing message, the recording of an incoming message or playback of a message, a message delete command, a previous message command, a next message command, and a volume adjustment command.

Control circuit 17 is responsive to these command messages received through communications circuit 33 to operate the main telephone answering device 11 in the same manner as if those commands were entered at keypad 31 at the main telephone answering device. However, the extension telephone answering device 15 cannot control a switch hook function at the main telephone answering device 11 and thus cannot initiate or answer a telephone call.

In addition, the communications circuits 33 and 45 are adapted to transmit audio information between the extension telephone answering device 15 and main telephone answering device 11. Thus, when a command is issued from the extension telephone answering device 15 to playback a recorded message, control circuit 17 which receives this command through communications circuit 33 acts upon it to cause the speech coder 21 to retrieve from memory 23 recorded messages which are sent through communications module 33 to communications mode 45 and to audio circuit 39 where the messages are played through speaker 43 of audio circuit 39.

In addition, if a user desires to record a new outgoing message from extension answering device 15, he indicates this through an entry at keypad 37 which is processed by control circuit 35 to cause a recorded new message command to be issued through the communications circuit 45. This command is received by the communications circuit 33, interpreted by control circuit 17 which then operates speech coder 21 to enable it to receive, encode and store the received outgoing audio message for later playback.

The new outgoing message is sent by way of microphone 41 through audio circuit 39, communications circuit 45 and to communications circuit 33 and it is received by the speech coder 21, encoded and stored in memory 23 for use as a new outgoing message.

As noted, the communications circuits 33 and 45 respectively provided at the main telephone answering device 11 and extension telephone answering device 15 are preferably Bluetooth™ compliant. Bluetooth™ is a known communications protocol which enables wireless devices to bond to and communicate with one another. Although the Bluetooth™ protocol is preferably used with the invention, it is not required and other communications protocols, including proprietary protocols, may be used. However, the Bluetooth™ specification is being widely adopted and is therefore the preferred protocol for use with the invention. The Bluetooth™ protocol enables a wireless device to bond with a plurality of other wireless devices. Thus, the main telephone answering device 11 is able to bond with and communicate with a plurality of extension answering devices 15, each through its own communications link which does not interfere with the other communication links bonding main telephone answering device 11 with other extension answering devices 15.

The bonding process can be initiated by either main telephone answering device 11 or extension answering device 15, and the bonding protocol is known in the art and is not described in detail herein. Suffice it to say that bonding can be accomplished using the "inquiry" and "page" features described in the Bluetooth™ specification and once bonding is established between a main answering device 11 and a particular extension telephone answering device 15, this bonding is then semi-permanent in that it remains until a user decides to break or change the bonding.

The extension answering device 15 is a stand alone device which does not control a switch hook function and thus is incapable of initiating or answering a telephone call. It is only able to operate the main telephone answering device. Accordingly, the circuitry of the extension answering device 15 is simple and inexpensive to implement. In addition, a plurality of extension answering devices 15, each communicating with the main telephone answering device, can be provided throughout a building. Still further the extension answering device 15 can control the main telephone answering device, when other telephone devices are in active use on a telephone call using line 14, and the main telephone answering device is not answering the existing call.

Figure 2:
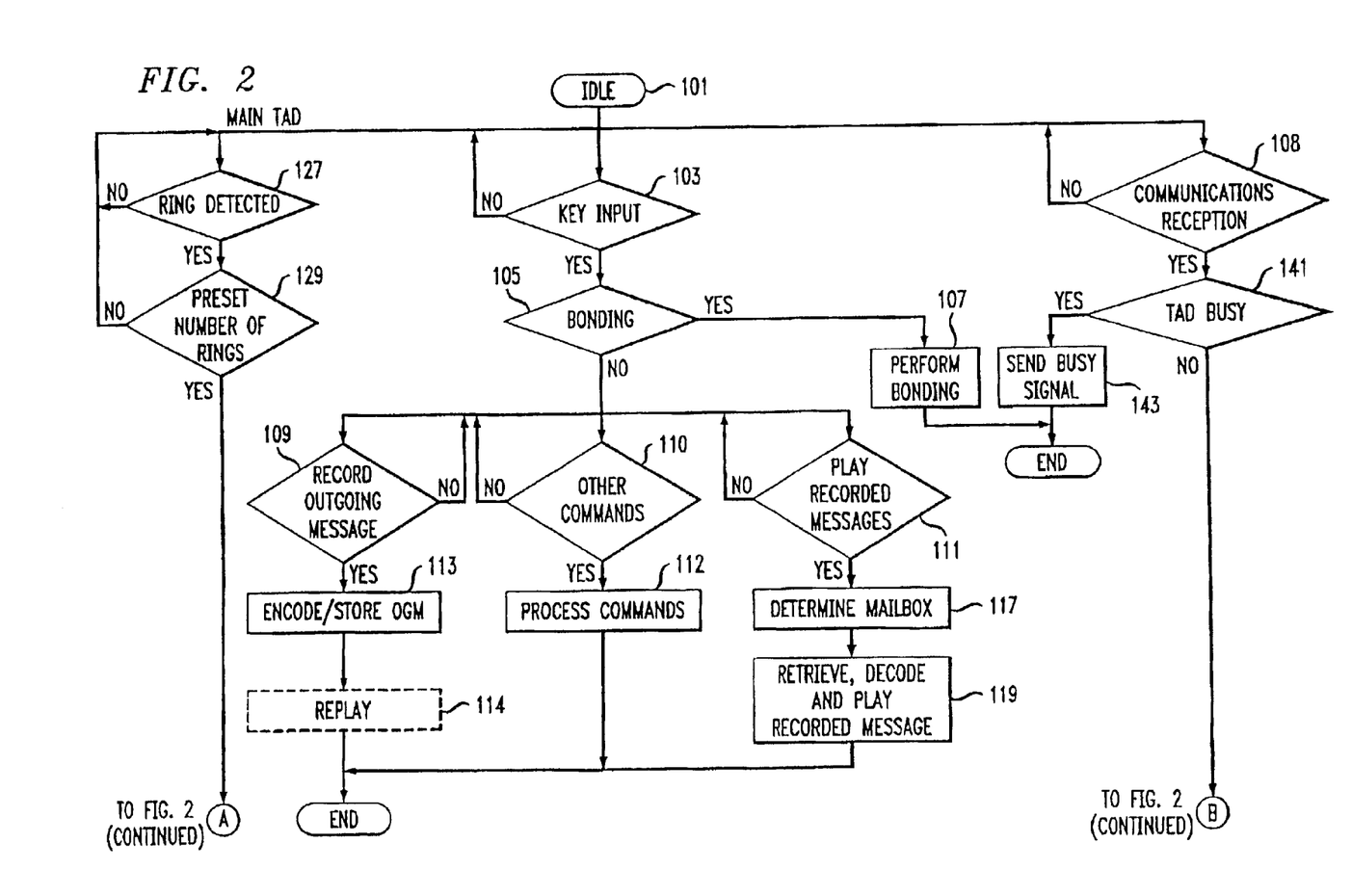
FIG. 2 illustrates in flow chart form the processing operations which occur at the main telephone answering device.
Figure 3:
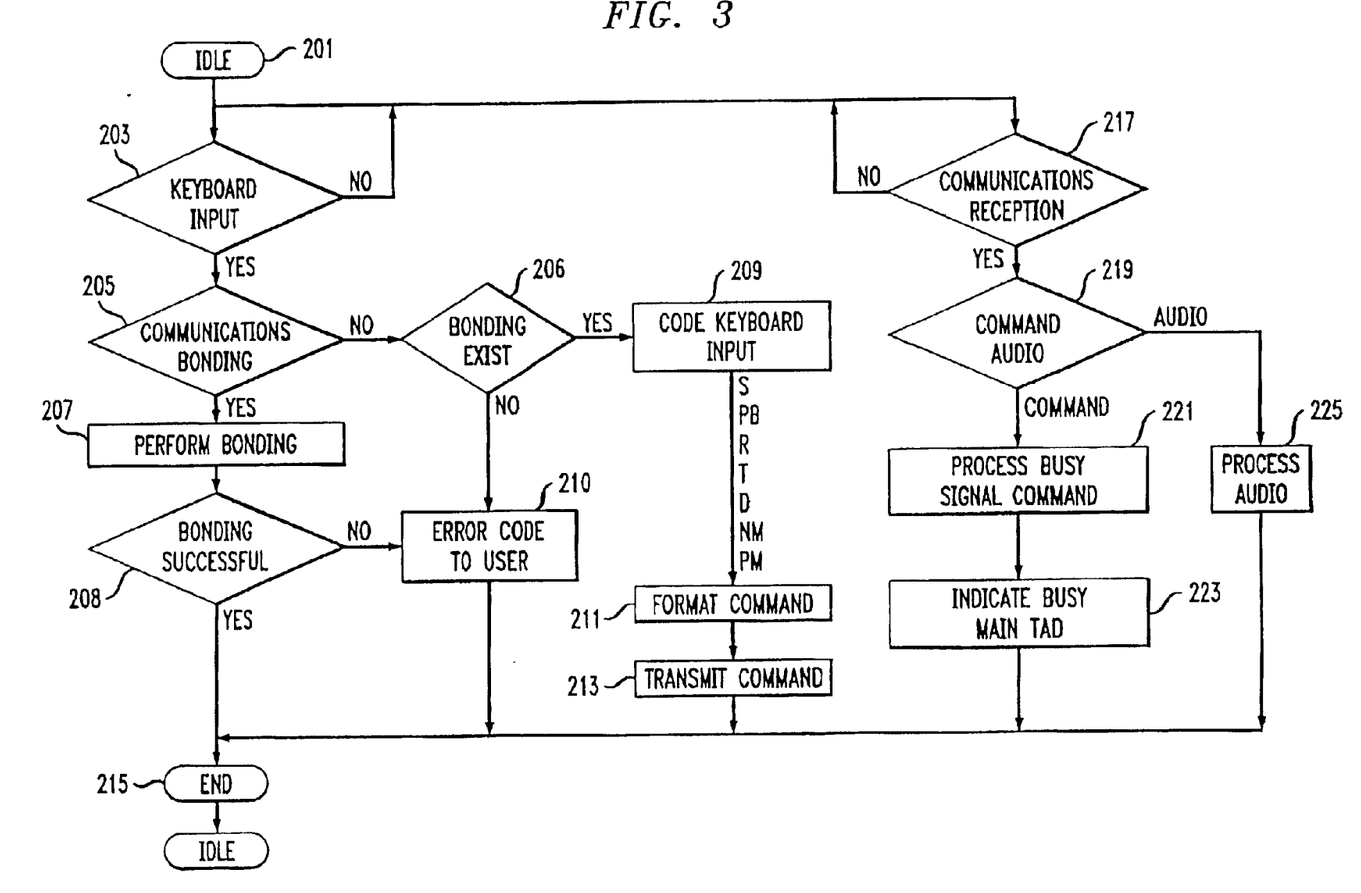
FIG. 3 illustrates the operations which are performed at the extension telephone answering device in accordance with the invention.

The functions and operations of each of the main telephone answering device 11 and extension answering device 15 will be more clearly illustrated in the following discussion presented in conjunction with flow charts shown in FIGS. 2 and 3 which respectively illustrate the operations performed at the main telephone answering device 11 (FIG. 2) and the extension telephone answering device (FIG. 3).

The operations which occur at the main telephone answering device 11 are illustrated in FIG. 2 and are controlled by the control circuit 17. Beginning at an idle process segment 101, the control circuit 17 checks for a ring detect condition at processing segment 127, a key input at processing segment 103, or a communication reception from an extension device at processing segment 108.

If a ring is detected in processing segment 107, control circuit 17 checks to see if a predetermined number of rings have been received at processing segment 129. The process returns to the ring detect processing segment. Once a prescribed number of rings is detected at a processing segment 129, the control circuit 17 determines what screening conditions have been preset in the main telephone answering device 11 by a user. Three message screening possibilities can be set at the main telephone answering device 11.

One is that screening occurs only at the main telephone answering device, one is that screening occurs at only the extension telephone answering device, and one is that screening can occur at both the main telephone answering device 11 and extension telephone answering device 15.

If screening has been set for only the main telephone answering device, control circuit 17 proceeds from processing segment 131 to processing segment 133 where it plays an outgoing message stored in memory 23 through speech coder 21, and then operates speech coder 21 to receive incoming messages which are then digitally sampled and encoded at processing segment 135 by the speech coder 21 and stored in memory 23 at processing segment 137.

Thus, when screening has been set at the main telephone answering device 11 for only the main telephone answering device, a call is answered and an outgoing message sent, and an incoming message recorded as conventional.

It should be noted that a processing segment 133 the outgoing message and incoming messages are all replayed through audio circuit 25 and speaker 29, so that a user at the main telephone answering device 11 can screen incoming telephone calls.

Returning to processing segment 131, if the screening has been set to occur only at the extension telephone answering device 15, then an outgoing message and incoming telephone messages are played at the extension telephone answering device 15. This occurs by having speech coder 21 pass an outgoing message through telephone line interface 14 over the telephone line, and also to communications circuit 33 for transmission to communications circuit 45 where the audio can then be replayed through audio circuit 39 and speaker 43. Thus, a user at the extension telephone answering device 15 is able to hear and screen incoming calls. Screening occurs at the extension telephone answering device 15 automatically without requiring any intervention of a user at the extension telephone answering device.

In addition to the outgoing message, any incoming messages received on line 14 which pass through telephone line interface 19 are also passed by the speech coder 21 to communications circuit 33 for transmission and to extension telephone answering device 15. The transmission is received at communications circuit 45 and the incoming message is then replayed through audio circuit 39 at speaker 43 so the user can hear any incoming messages.

While the user at extension telephone answering device 15 is able to hear and thus screen incoming messages, the speech coder 21 is also recording any incoming messages and storing them in memory 23. This processing is again illustrated by processing segments 135 and 137 in FIG. 2.

Returning again to processing segment 131, if the screening has been set so that both the main telephone answering device 11 and the extension telephone answering device 15 are capable of screening calls, then the outgoing message and incoming messages are played through the audio circuits 25 and 39 of each of the main telephone answer device 11 and extension telephone answering device 15.

Thus, control circuit 17 operates speech coder 21 causing it to pass outgoing and incoming telephone messages to the communications circuit 33 for transmission to the extension telephone answering device 15, as well as to pass incoming and outgoing messages to the audio circuit 25 and speaker 29 of the main telephone answering device 11.

The extension telephone answering device in turn receives the audio communications through communications circuit 45 and audio circuit 39 and plays those messages through speaker 43. The control circuit 17 also operates the speech coder 21 at processing segments 135 and 137 to send an outgoing message through line interface 19 to the telephone line 14 and sample and encode incoming messages and store the incoming messages in memory 23.

As an alternative way of handling call screening, the main telephone answering device 11 and each telephone answering device 15 may have a screening on/off switch which is user selectable to enable/disable a call screening function at each device. The main telephone answering device 11 would then operate as if the "both" screening option had been set, as detected at processing segment 131, with screening being enabled/disabled locally at each main telephone answering device 11 and extension answering device 15.

Returning to processing segment 103, control circuit 17 also determines whether a key input has been received from keypad 31 or other input device. If an input has been detected, control circuit 17 determines whether the key entry requires a bonding operation between the main telephone answering device 11 and extension telephone answering device 15. If so, then processing proceeds from processing segment 105 to processing segment 107, where a communications bonding operation is executed. This bonding process, as noted, is conventional and is not described in detail herein. Following completion of the bonding process at processing segment 107, the control circuit proceeds to end the processing at segment 115.

An alternative way of bonding a main telephone answering device 11 to an extension answering device 15 would be to have the bonding process initiated automatically at the extension answering device 15 in response to the first time any operative key is depressed at an extension answering device 15.

Referring back to processing segment 105, if a bonding operation is not indicated by a keypad input, the control circuit 17 then examines the keypad entry and processes an entered command. Thus, for example, if a command for a recording a new outgoing message is detected in processing segment 109, control circuit 17 operates the speech coder 21 to receive a new message for recording from microphone 27 of audio circuit 25, which is then encoded and stored in processing segment 113 in memory 23. If desired, a replay of the recorder message can be played back to a user through audio circuit 25 and speaker 29 at replay segment 114.

If a command for playing a previously recorded message is detected by control circuit 17 in processing segment 111, the control circuit 17 also then determines which mailbox messages are to be played back from in processing segment 17. This information is also provided by keypad 31 to control circuit 17. Control circuit 17 then operates speech coder 21 to retrieve from memory 23 messages from the designated mailbox and decode and play those recorded messages through audio circuit 25 and speaker 29.

If another command is detected by control circuit 17 at processing segment 110, that command is then processed at processing segment 112 and appropriate action is taken. Other commands which may be received and acted upon by control circuit 17, include a delete message command, a next message command, a previous message command, a transfer message command for transferring messages among mailboxes, and a stop command, among others. Thus, in processing segment 112 these commands are executed in conventional fashion by control circuit 17 to enable these functions to be performed at the main telephone answering device 11. Following this, the processing proceeds to end processing segment 115.

Referring now to processing segment 108, if control circuit 17 detects that a reception has been received through the communication circuit 33, it first determines in processing segment 141 if it is itself busy and cannot respond to the incoming reception. If the main telephone answering device 11 is busy, and it does not have the resources to process the incoming reception, it will send a busy signal at processing segment 143 through the communications circuit 33 back to the extension telephone answering device 15. This message will be received through the communications circuit 45 at the extension telephone answering device 15 and processed by control circuit 35, which will then indicate a busy signal at the extension answering device 15.

Assuming that the main telephone answering device is not busy as determined at processing segment 141, the control circuit 117 will determine whether the incoming communication is a command communication or an audio communication. If it is a command communication, the control circuit 17 will proceed to decode the command in processing segment 147. Possible incoming commands from an extension telephone answering device 15 include a message delete command, next message command, previous message command, transfer message command, message playback command, stop command, and record an outgoing message command, among others.

These messages are respectively decoded by processing segment 147, and each is respectively processed at processing segments 148, 149 151, 153, 155, 157 and 159. Once the processing of these commands is complete, processing continues to the end segment 115.

Returning to processing segment 145, if an audio transmission is incoming through communications circuit 33, the audio will be processed by the audio processing circuit 161. Thus, if for example, a record command has been received from the extension telephone answering device 15, the control circuit 17 will operate the main telephone answering device 11 to record a new outgoing message in the same manner as if a record command had been received from keypad 31 of the main telephone answering device 11. The incoming message, however, instead of being received through microphone 27, is now received through communications circuit 33 from a communications transmission from communication circuit 45 in the extension telephone device 15. This communication is initiated at microphone 41 of audio circuit 39 which is communicated to the communications circuit 45.

Thus, control circuit 21, after receiving the record command then further processes the subsequent audio information at processing segment 161 to cause the speech coder 21 to record audio from the communications circuit 31 as a new outgoing message and storing the new outgoing message in memory 23.

If the decoded command at processing segment 147 is a playback command, control circuit 17 causes the speech coder 21 to playback recorded messages, but instead of playing them through speaker 29, the messages are transmitted through communications circuit 33 to communications circuit 45, which in turn passes the audio message through audio circuit 39 and speaker 43 so that the user at the extension telephone answering device 15 is able to hear the played back message.

The control circuit 17 is also, as noted, responsive to other commands received from the extension telephone answering device 15 such as a delete message command which causes the control circuit 17 to delete a message stored in memory 23; a next message command which causes control circuit 17 to skip to the next message stored in memory 23 for playback at the extension telephone answering device 15; a previous command which causes the control circuit 17 to revert to a previously stored message in memory 23 for playback at the extension telephone answering device 15.

Control circuit 17 also, in response to a transfer command received from the extension telephone answering device 15, operates speech coder 21 to transfer a recorded and stored message in memory 23 from one mailbox to another mailbox. Control circuit 17 is also responsive to a stop command received from the extension telephone answering device 15 to stop operations then in progress.

While exemplary operations which are performed at the main telephone answering device 11 have been described and illustrated with reference to processing shown in FIG. 2, it should be understood that this is only one exemplary processing which can be performed by the main telephone answering device 11. Other answering machine functions may also be incorporated within the system and variations can be made in the functions which have been described.

FIG. 3 illustrates the processing which is performed at the extension telephone answering device 15 under control of control circuit 35. Processing begins at idle segment 201. Control circuit 35 determines at processing segment 203 whether an input has been received, for example, from keypad 37. If so, control circuit 35 determines whether the entry indicates that a communications bonding process is to be initiated at processing segment 205. The keypad for the extension answering device may be provided with a separate key for initiating the bonding process, or as also described above, bonding can be initiated the first time any key on the extension answering device 15 keypad is depressed. If a bonding process is to be initiated, the bonding process is started and completed at processing segment 207. As noted above, the bonding process between two communications devices is preferably through Bluetooth™ compliant communications circuits 33 and 45. As noted, such bonding process is conventional and is not described in detail herein.

Processing segment 208 determines whether bonding was successful and, if so, the process proceeds to end segment 215 and then to an idle state. If bonding was not successful, an error code is displayed by control circuit 35 on display 38, and the process proceeds to end segment 215 and then to idle.

Referring back to processing segment 205, if a Bluetooth™ bonding process is not requested at processing segment 205, then control circuit 35 will confirm that a bonding previously occurred in processing segment 206 and, if not, an error code is generated and displayed in processing segment 210 and the process proceeds to end segment 215, and then to idle. If a successful bonding previously occurred, then control circuit 35 will examine the keypad entry with respect to possible operational commands. The operational commands which can be performed at the extension telephone device include stop, playback, record a new outgoing message, transfer a message from one mailbox to another, delete a message, next message, and previous message.

An entered operational command is coded in processing segment 209 and formatted in processing segment 211. The command is then transmitted at processing segment 213 by passing the command to the communications circuit 45, which then sends the command to the main telephone answering device 11. The extension telephone answering device then proceeds to the end segment 215.

Control circuit 35 also monitors to see if a communications reception is received by communications circuit 45 at processing segment 217. If a communications reception has been detected, the control circuit 35 determines whether the reception is a command reception or an audio reception. If the reception is a command reception, the control circuit 35 will process that command section in process segment 221. One command which is sent from the main telephone answering device 11 to the extension telephone answering device 15 as noted above is the busy signal indication. Thus, in processing segment 221 if a busy signal indication is detected by control circuit 35, it will process the command and provide an indication at the extension telephone answering device 15 of the fact that the main telephone answering device is busy. This occurs at processing segment 223 following which the control circuit 35 proceeds to the end processing segment 215.

Referring back again to processing segment 219, if an audio reception was detected, for example, if a screening operation or a message playback operation is occurring through the extension telephone answering device 15, that audio communication received through communication circuit 45 is processed at processing segment 225 in which case the audio communication is directed through audio circuit 39 and is reproduced to a user through speaker 43.

In another alternative arrangement, control circuit 17 can also be programmed to revert to a local playback of messages (outgoing, incoming and previously recorded) if a remote playback at extension answering device 15 is set, but the extension answering device 15 is out of the transmission range of main telephone answering device 11.

While the invention has been described and illustrated with respect to a specific embodiment thereof, it should be clear that many modifications, changes and substitutions can be made without departing from the spirit and scope of the invention. Accordingly, the invention is not limited by the foregoing description, but is only defined by the appended claims.

What is claimed as new and desired to be protected by Letters Patent of the United States is:

1. A telephone answering system comprising:
   a main telephone answering device for answering telephone calls including a first control circuit for controlling operations of said main telephone answering device, a first communication circuit, and a storage medium for storing incoming telephone messages;
   an extension answering device including a second control circuit for controlling operations at said extension answering device, and a second communications circuit which communicates with said first communications circuit, said second control circuit causing said extension answering device to retrieve stored incoming messages from said main telephone answering device through said first and second communications circuits, reproduce said retrieved stored incoming messages and send a command to said main telephone answering device, said first control circuit causing said main telephone answering device to send a busy signal to said extension answering device when unable to process said command.

2. A telephone answering system as in claim 1 wherein said storage medium stores an outgoing message and said second control circuit causes said extension telephone answering device to communicate with said first control circuit to cause said main telephone answering device to store an outgoing message in said storage medium.

3. A telephone answering system as in claim 1 wherein said extension answering device is never capable of initiating a telephone call.

4. A telephone answering system as in claim 1 wherein said main telephone answering device further comprises a first audio reproducing circuit and said extension answering device further comprises a second audio reproducing telephone circuit, and wherein said first control circuit causes said main telephone answering device to answer an incoming telephone and in response thereto reproduce an outgoing message stored in said storage medium over a telephone line, said first control circuit also causing said main telephone device to communicate said outgoing message to said extension answering device, said second control circuit causing said extension answering device to reproduce said communicated outgoing message through said second audio reproducing circuit.

5. A telephone answering system as in claim 4 wherein said second control circuit causes said extension answering device to reproduce said communicated outgoing message without intervention of a user at said extension answering device.

6. A telephone answering system as in claim 4 wherein said first control circuit causes said main telephone answering machine to also reproduce said outgoing message stored in said storage medium through said first audio reproducing circuit.

7. A telephone answering system as in claim 4 wherein said first control circuit causes said main telephone answering device to store incoming telephone messages in said storage medium after said outgoing message is played, said first control circuit causing said main telephone answering device to communicate incoming telephone messages to said extension telephone answering device, said second control circuit causing said extension telephone answering device to reproduce said incoming telephone messages through said second audio reproducing circuit.

8. A telephone answering system as in claim 7 wherein said second control circuit causes said extension answering device to reproduce said incoming telephone messages without intervention of a user at said extension answering device.

9. A telephone answering system as in claim 8, said second control circuit causing said extension telephone device to send said command to said main telephone device to stop reproduction of an outgoing message or storage of an incoming message, said first control circuit in response to receipt of and when able to process said command causes said main telephone answering device to stop reproduction of an outgoing message or storage of an incoming telephone message.

10. A telephone answering system as in claim 1 wherein said storage medium stores recorded telephone messages in mail boxes associated with respective users, and said second control circuit causes said extension answering device to request recorded messages from said main telephone answering device from one of said mail boxes, said first control circuit in response to said request causing said main answering device to communicate incoming messages from a requested mail box to said extension answering device.

11. A telephone answering system as in claim 10 wherein said second control circuit causes said extension answering device to request transfer of a recorded message from one said mail box to another, said first control circuit in response to receipt of a transfer request causing said main answering device to produce said requested transfer.

12. A telephone answering system as in claim 1 wherein said first and second communications circuits are Bluetooth™ compliant communications circuits.

13. An extension answering device comprising:
    an audio circuit for reproducing an audio output to a user;
    a communications circuit for transmitting and receiving wireless messages directed to and received from a main telephone answering device; and
    a control circuit for controlling operations at said extension telephone answering device, for causing answering machine operation commands to be issued through said communications circuit to said main telephone answering device, and for responding to a busy signal received by said communications circuit to provide a busy signal indication, said control circuit never capable of controlling the initiation of a telephone call.

14. An extension answering device as in claim 13 wherein said control circuit causes said communications circuit to wirelessly transmit an outgoing message audio input received at said audio circuit to said main telephone answering device.

15. An extension answering device as in claim 13 wherein said control circuit causes audio information received through said communications circuit during a call screening mode to be reproduced at said extension answering device without user intervention.

16. An extension answering device as in claim 13 further comprising an input device for entering answering machine operation commands, said control circuit being responsive to said entered commands for causing transmission of said entered commands by said communications circuit to said main telephone answering device.

17. An extension answering device as in claim 16 wherein said entered commands include a message playback command.

18. An extension answering device as in claim 16 wherein said entered commands include an outgoing message record command.

19. An extension answering device as in claim 16 wherein said entered commands include a mail box message transfer command.

20. An extension answering device as in claim 16 wherein said entered commands include a stop command.

21. An extension answering device as in claim 16 wherein said entered commands include a message delete command.

22. An extension answering device as in claim 16 wherein said entered commands include a next message command.

23. An extension answering device as in claim 16 wherein said entered commands include a previous message command.

24. An extension answering device as in claim 13 wherein said communications circuit is Bluetooth™ compliant.

25. An extension answering device as in claim 24 wherein said control circuit operates said communications circuit to establish a Bluetooth™ communications link between said extension telephone answering device and said main telephone answering device.

26. A method of operating a telephone answering system comprising:
    establishing a wireless communications link between a main telephone answering device and at least one extension answering device that is never capable of initiating a telephone call, said main telephone answering device having a switch that turns on or turns off call screening operation at said main telephone answering device independently from said call screening operation at said at least one extension answering device; and
    operating said main telephone answering device to send audio information over said link to said extension answering device at least during said call screening operation without requiring user intervention at said extension answering device.

27. A method as in claim 26 further comprising operating said main telephone answering device by commands issued by said extension telephone answering device, at least one of said commands being a playback command, said method comprising transmitting playback messages from said main telephone answering device to said extension answering device in response to receipt of said playback command.

28. A method as in claim 26 further comprising answering incoming telephone calls at said main telephone answering device and transmitting the contents of said answered incoming calls to said extension answering device as part of said call screening operation.

29. A method as in claim 26 further comprising recording an outgoing message originated at said extension answering device at said main telephone answering device for use in answering incoming telephone calls.

30. A method as in clam 28 further comprising transmitting an outgoing message to a telephone line at said main telephone answering device when an incoming call is answered, and transmitting said outgoing message to said extension answering device as part of said call screening operation.

31. A method as in claim 27 wherein at least one of said commands is a stop command, said method further comprising stopping predetermined operations from occurring at said main telephone answering device in response to receipt of said stop command.

32. A method as in claim 26 wherein said wireless communications link is a Bluetooth™ communications link which is established in response to a key activation at least one of said main telephone answering device and said extension answering device.

33. A method as in claim 32 further comprising establishing said Bluetooth™ communications link in response to an initial pressing of any key on a keypad of said extension answering device.

34. A method of operating an extension telephone answering device comprising:
    establishing a wireless communications link between said extension telephone answering device capable of sending commands and never capable of initiating a telephone call and a main telephone answering device, having an associated switch hook function, that responds to said commands with a busy signal when unable to process said commands; and
    controlling operations at said main telephone answering device from said extension telephone answering device without controlling said switch hook function.

35. A method of operating an extension telephone answering device comprising:
    establishing a wireless communications link between said extension telephone answering device and a main telephone answering device coupled to a telephone line wherein said extension telephone answering device is never capable of initiating a telephone call;
    controlling operations at said main telephone answering device from said extension telephone answering device during a time when an active call is in progress on said telephone line and said main telephone answering device is not answering said active call.

* * * * *